3,766,250
META-UREIDOPHENYLALKYL CARBAMATES
Kenneth P. Dorschner, Jacksonville, Fla., and James A. Albright, St. Louis, Mich., assignors to SCM Corporation, Cleveland, Ohio
No Drawing. Filed Aug. 15, 1972, Ser. No. 280,831
Int. Cl. C07c 125/06
U.S. Cl. 260—482 C    6 Claims

ABSTRACT OF THE DISCLOSURE

Novel meta-ureidophenylalkyl carbamates are shown to have valuable herbicidal activity.

BACKGROUND OF THE INVENTION

This invention relates to a new class of meta-ureidophenylalkyl carbamates, herbicidal compositions containing same, and a process for controlling plant growth therewith.

Numerous ureido-substituted phenyl carbamates, typified in U.S. Pat. 3,434,822, are described as being soil sterilants or herbicides used to eradicate all plant species.

Surprisingly, it has been found that by inserting a $C_{1-6}$ alkylene group between the phenyl ring and the carbamate moiety of the above known carbamates, selective herbicides result which kill or stunt the growth of weeds in a germinating or growing crop without harming the plant crop.

SUMMARY OF THE INVENTION

One aspect of this invention is a meta-(substituted ureido)phenylalkyl carbamate wherein said phenylalkyl moiety contains 7–12 carbon atoms; at least one of the hydrogen atoms attached to the carbamate nitrogen atom is substituted with a lower alkyl, lower hydroxyalkyl, or halogenated lower alkyl radical; the ureido nitrogen joined to the phenyl nucleus is unmethylated or methylated; and the other ureido nitrogen atom is substituted with at least one lower alkyl, lower hydroxyalkyl, or lower alkoxy radical.

Another aspect of this invention is a herbicidal composition comprising about 1 to about 98 percent of such phenylalkyl carbamate and an agriculturally acceptable carrier therefor.

Still another aspect of this invention is a process for controlling growth of vegetation which comprises applying to the locus of such vegetation such phenylakyl carbamate at the rate of about 0.5–25 pounds per acre.

The subject compounds can be depicted structurally as follows:

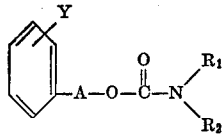

wherein

A is a $C_{1-6}$ alkylene radical.
$R_1$ is a $C_{1-6}$ lower alkyl, halogen-substituted lower alkyl or lower hydroxyalkyl radical,
$R_2$ is hydrogen, a $C_{1-6}$ lower alkyl, halogen-substituted lower alkyl or a lower ($C_{1-6}$) hydroxyalkyl radical, and
Y is a substituted ureido group selected from the group consisting of:
3,3-di(lower)alkylureido;
3-(lower)alkoxy-3-(lower)alkyl ureido;
3-(lower)alkylureido; and their 1-methyl and 1-ethyl counterparts.

In general, for efficiency and economy of preparation and herbicidal use, the alkylene group A of the above-described phenylalkyl carbamates advantageously is a methylene or ethylene group, although various other normal and isomeric alkylene materials also are economically attractive, $R_1$ is a lower alkyl radical (preferably ethyl or tert-butyl), $R_2$ is hydrogen and Y is a 3,3-di(lower) alkylureido radical (preferably the 3,3-dimethylureido radical). It is, of course, within the skill of the art to use in place of the alkylene groups A, allyl and like stable hydrocarbyl groups; in place of the aliphatic $R_1$ groups, straight phenyl or phenyl as commonly ring-substituted with halogen, nitro and alkyl groups. It is also contemplated that $R_1$ and $R_2$ when taken together with the carbamate nitrogen can form a heterocyclic ring containing 5 or 6 atoms, such as, for example, piperidine and morpholine.

Also, surprisingly, while many of the subject compounds are useful for post-emergent selective herbicides, some, as will be shown, can be applied pre-emergently to the plant locus, and some even soil-incorporated with effectiveness for weed control.

Application dosages of these herbicides, based on the active ingredient, suitably can be fairly high, but for economy generally are about 15 pounds per acre or below, advantageously not more than about 8 pounds per acre, and generally 0.5–8 pounds per acre, although dosages as high as 40 pounds per acre can be used.

By crop plants is meant not only agricultural crops which are used for food supply of man and animals, but also other desirable plants such as forage grass and lawn species where broad leaf and other undesirable weeds are to be controlled, suppressed, or eradicated.

In general, the metalureidophenylalkyl carbamates of this invention are effective in the elimination or control of weeds including coffeeweed (Sesbania spp.), pigweed (Amaranthus spp.), crabgrass (Digitario spp.), barnyard grass (Echinochloa spp.), without significant injury to the specific crops, such as, rice, corn, oats, cotton, and soybeans.

Conventional formulations can be used to apply these herbicides using agriculturally acceptable carriers which are inert towards the subject carbamates and not harmful to the operator or the environment of the plant. Hence, intermediates, unreacted excess reactants or reagents, by-products of reaction, and solvents containing such extraneous chemical material definitely are not a part of the inventive compositions, the latter whose active ingredients should be fairly commercially pure compounds, e.g., 85% purity or higher with only innocuous diluents admixed with them.

Applications as wettable powders dispersed in an aqueous medium are preferred when the oxazolidine is relatively insoluble in the application solvent. Wettable powders can be formulated from inert carriers such as, clays, talc, diatomaceous earth and other siliceous inorganic solids and silicates. Although the wettable powder can contain any proportion of active herbicides from about 1 to 98 percent, it is generally more economically feasible to use a high loading of active selective herbicide material. Active ingredient concentration of 50–90 percent, based on weight of inert carrier, is recommended and concentrations roughly of 80 weight percent active ingredient are preferred. It is desirable that both the inert carrier and herbicide, if solids, be ball-milled or ground by other common techniques to a very fine state of subdivision so that they will pass through a 325-mesh screen (U.S. Standard Sieve).

The formulation can contain various other agents to wet, disperse, and emulsify the herbicidal composition whether or not a solvent is used in the application to the locus of the plant or to the soil. The surfactants or other detergents employed can be anionic, nonionic, or cationic as are detailed in McCutcheon's 1969 publication on Detergents and Emulsifiers. Surfactants useful in formulation of our selective herbicides, are usually added in amounts of 1 to 10 percent based on the total weight of wettable powder formulation but generally in the order of 2 percent. These can be alkyl and alkylaryl polyether alcohols, polyoxyethylene sorbitols, or sorbitan fatty acid esters, alkylaryl sulfonates, long chain quaternary ammonium chlorides, and the like.

Water emulsions may be prepared with the aid of emulsifiers such as triethanolamine stearate, sodium lauryl sulfonate, sodium alkyl naphthalene sulfonate, sodium oleate, p-t-octylphenoxy-polyethoxy ethanol, as well as other well-known emulsifiers.

The characteristic of a good selective herbicide is that when it is applied near or on the foliage of the crop plant, only the weed species is killed while the valuable crop plants are not harmed beyond the point of recovery, thus allowing a high percentage (85–100 percent) to mature to harvestable crops.

SYNTHESIS

The ureidophenylalkyl carbamates of this invention can be synthesized by modification of known techniques for the preparation of ureidophenyl N-alkylcarbamates. Preferable starting materials are the meta-aminophenylalkanols such as meta-aminobenzylalcohol, meta-aminophenylethyl alcohol, meta-aminophenylpropyl alcohol and the like which generally can be obtained by reduction of the corresponding nitro analogues. Generally, the meta-aminophenylalkanol is first reacted with N,N-dialkyl carbamoyl chloride to form the metal-(substituted ureido)phenylalkanol which is further treated with an isocyanate to yield the carbamates of this invention. In many cases the products are solids which can be conveniently purified by fractional crystallization.

The following examples are intended to illustrate the invention but not to limit the scope thereof, parts and percentages being by weight unless otherwise indicated.

EXAMPLE 1

Meta-(3,3-dimethylureido)benzyl N-ethylcarbamate

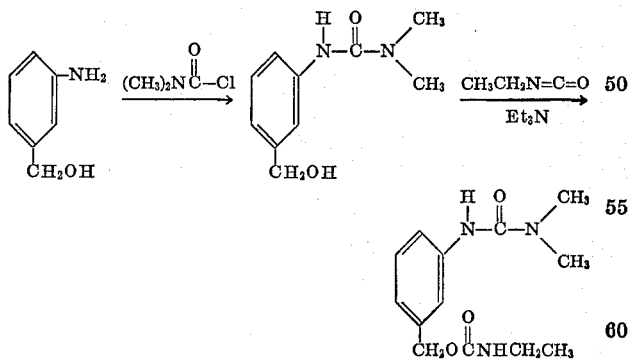

Dimethyl carbamoylchloride (20 g.) was added dropwise to a magnetically stirred solution of meta-aminobenzyl alcohol (23 g.) and triethylamine (18.9 g.) in 100 ml. of dioxane. The reaction mixture was stirred for 24 hours at room temperatures. After filtering, the dioxane solvent was removed by distillation, leaving crude meta-(3,3-dimethylureido) benzyl alcohol as a thick oil.

The crude ureido benzyl alcohol (37 g.) was mixed with ethyl isocyanate (27 g.) and 10 drops of triethylamine and allowed to stand for 4 days. A solid was isolated by filtration and recrystallized from ethyl acetate to yield 8.6 g. of a tan solid, M.P. 99–102° C.

EXAMPLE 2

Meta-(3,3 - dimethylureido)benzyl N-methylcarbamate was prepared in a manner similar to the procedure shown in Example 1, except that methyl isocyanate was used in place of ethyl isocyanate. The product was isolated as a white solid, M.P.116–120° C. Verification of structure was made using infrared spectroscopy.

EXAMPLE 3

Meta-(3,3-dimethylureido)benzyl N-(tert-butyl)carbamate was prepared in a manner similar to the procedure shown in Example 1, except that tert-butyl isocyanate was used in place of ethyl isocyanate and 10 drops of dibutyl tin diacetate was used in place of the triethylamine catalyst. The desired product was isolated as a white solid, M.P. 107–108° C.

The following meta-ureidophenylalkyl carbamates may be prepared in a manner similar to the procedures described above:

EXAMPLE 4

Meta - (3,3-dimethylureido)benzyl N-(2-hydroxyethyl) carbamate.

EXAMPLE 5

Meta-(3,3-dimethylureido)benzyl N - (2 - bromoethyl) carbamate.

EXAMPLE 6

2-[meta-(3-methylureido)phenyl]ethyl N-methylcarbamate.

EXAMPLE 7

2-[meta(3,3-dimethylureido)phenyl]ethyl N - ethylcarbamate.

EXAMPLE 8

2-[meta-(3,3-dimethylureido)phenyl]ethyl N - (2-chloroethyl)carbamate.

EXAMPLE 9

2-[meta - (3,3 - dimethylureido)phenyl]propyl N-ethylcarbamate.

EXAMPLE 10

4-[meta-(3,3-dimethylureido)phenyl]butyl N-ethylcarbamate.

EXAMPLE 11

2,2 - dimethyl - 2 - [meta-(3,3-dimethylureido)phenyl] butyl N-methylcarbamate.

EXAMPLE 12

Meta-(3,3-dimethylureido)benzyl N,N-pentamethylenecarbamate.

EXAMPLE 13

Meta-(3,3-dimethylureido)benzyl N - cyclohexyl carbamate.

EXAMPLE 14

Meta-(3,3-dimethylureido)benzyl N-(3'-cyclohexenyl) carbamate.

EXAMPLE 15

Meta - (3,3 - dimethylureido)benzyl N-(4'-chlorocyclohexyl)carbamate.

EXAMPLE 16

Meta-(3-methylureido)benzyl N-allylcarbamate.

EXAMPLE 17

Meta-(3-methylureido)benzyl N-phenylcarbamate.

EXAMPLE 18

Each experimental candidate pesticide was formulated to assure substantially uniform broadcast of 8.0 pounds active ingredient (candidate) per acre. The resulting compositions were then evaluated as pre-emergence, post-emergence and as soil-incorporated herbicides.

Pre-emergence

In pre-emergence herbicidal testing, typical crop plant and weed species were seeded in indivdual flats, watered in amounts adequate to moisten soil and held for 24 hours before treatment. Candidate chemicals were then applied to the soil surface of flats, taking care to assure that no seedlings had emerged from the soil before chemical treatment.

Post-emergence

In post-emergence herbicidal testing, appropriate crop plant and weed species were seeded by growth-time requirement schedules in individual disposable flats, watered as required, and maintained under greenhouse conditions. When all crop plants and weeds had reached suitable growth development, generally first true leaf stage of the slowest plants, weeds appropriate to pertaining test requirements were selected for uniformity of growth and development. A four-inch container of each plant and weed, averaging six (corn) to fifty (crabgrass) or more plants or weeds per individual container was then placed on carrying tray for treatment. Ordinarily, six crop and six weed containers were used in each evaluation.

Soil-incorporated

Soil-incorporation is primarily an attempt to reduce loss of chemical by volatility and/or solar degradation. In this screening program, soil-incorporation was accomplished by application of the chemical to exposed seeds before covering with fresh untreated soil.

Formulation

Candidate compositions were dissolved in acetone and diluted with water.

One carrying tray each of pre-emergence (six crops and six weeds) and post-emergence (six crops and six weeds) containers, mounted on a conveyor belt of 1.5 M.P.H. linear speed, tripped a microswitch which in turn activated a solenoid valve and released treatment. Candidate compounds were discharged with pressure as sprays. The treated trays were removed to the greenhouse and held for observation.

Reference standards, sterile flats and untreated controls received similar care and handling.

Observations

Pre-emergence and post-emergence treatments were observed daily for interim response, final observations being made fourteen days after treatment. Any treatments inducing questionable response were held beyond the fourteen-day observation period until such responses were confirmed.

Observations included all abnormal physiological responses of stem bending, petiole, curvature, epinasty, hyponasty, retardation, stimultion, root development, necrosis, chloresis and related growth regulant characteristics.

Evaluation of the herbicidal performance of the experimental compounds was made by comparison of plant stands in the treatment with those found in untreated controls.

Where complete kill (100% control) of a plant species was not obtained, herbicidal performance is indicated by two methods. The first is a numerical rating 0 to 100 and represents percent of the plants actually killed at the time of observation. A second indication of herbicidal performance was a vigor rating (a) to (d) indicated in the tables as exponents which indicates the general health and appearance of the plants after the chemical treatment. The vigor ratings are as follows:

(a) Severe injury—Plants will eventually die.
(b) Moderate injury—Plants may or may not recover.
(c) Moderate injury—Plant will recover.
(d) Slight injury—Plants only slightly behind control.
No exponent—No injury. Plants similar to untreated control.

Thus, a chemical having a rating of 0(a) on barnyard grass is nearly as effective as another chemical providing 100% kill of this weed. In the table, where there was no plant injury, the rating 0 with no exponent is recorded. Where the percent kill was 50 percent or below, the appropriate exponent indicating plant injury was used. Where the percent kill exceeded 50 percent, no such exponent rating is shown.

Table I summarizes the herbicidal activity of various meta-(3,3-dimethylureido)benzyl carbamates. Suprisingly, these carbamates are very effective as pre-emergence, post-emergence and soil-incorporated herbicides when applied at 8 pounds active ingredient per acre and compare favorably with a commercial noncarbamate standard, N-α-chloroacetyl) N-(isopropyl) aniline ("Ramrod").

As seen in Table I, the compound of Example 2, meta-(3,3-dimethylureido)benzyl N-ethylcarbamate, selectively protects the crop plants cotton and soybean from the undesired weeds, such as, coffeeweed, crabgrass, pigweed, and barnyard grass.

EXAMPLE 19

The compounds of Example 4 through 17 will be essentially equivalent to the compounds of Example 18 in herbicidal activity when applied ond tested as pre-emergence, post-emergence and soil-incorporated by the methods indicated in Example 18.

TABLE I.—HERBICIDAL ACTIVITY OF META-UREIDOBENZYL CARBAMATES

| Compound | Application Lbs./acre | Type | Millet | Rape | Soybean | Coffee weed | Rice | Oats | Pig weed | Corn | Crab grass | Cotton | Barnyard grass |
|---|---|---|---|---|---|---|---|---|---|---|---|---|---|
| Compound of Example 1 | 8 | Pre | 0(a) | | 0(b) | 100 | 20(a) | | 100 | 0(d) | 30(a) | 0 | 0(b) |
| | 8 | Post | 30(a) | | 100 | 100 | 0(b) | | 100 | 0(c) | 100 | 100 | (a) |
| | 8 | S.I. | 0(c) | | 100 | 100 | 100 | | 100 | 0(b) | 0(b) | 100 | 0(b) |
| Compound of Example 3 | | | | | | | | | | | | | |
| Compound of Example 2 | 8 | Pre | 100 | 100 | 100 | 100 | | 100 | | 75 | 100 | 0(c) | 100 |
| | 8 | Post | 100 | 100 | 100 | 100 | | 100 | | 100 | 100 | 100 | 100 |
| | 8 | S.I. | 100 | 100 | 100 | 100 | | 100 | | 100 | 100 | 100 | 100 |
| N-(α chloro-acetyl)-N-isopropyl aniline (Standard) | 8 | Pre | 100 | 0(d) | 20(b) | 100 | | 100 | | 0 | 100 | 0(c) | 100 |
| | 8 | Post | 75 | 75 | 20(b) | 100 | | 80(b) | | 0 | 100 | 0(c) | 100 |
| | 8 | S.I. | 100 | 0(d) | 50(b) | 100 | | 100 | | 0 | 100 | 100 | 100 |

Vigor rating: (a) Severe injury—plants will eventually die. (b) Moderate injury—plants may or may not recover. (c) Moderate injury—plants will recover. (d) Slight injury—plants only slightly behind control. No exponent—No injury—plants similar to untreated control.

Having thus described the invention, what is claimed is:

1. A meta-(substituted ureido)phenylalkyl carbamate wherein: said phenylalkyl moiety contains 7–12 carbon atoms; at least one of the hydrogen atoms attached to the carbamate nitrogen atom is replaced with a lower alkyl, lower hydroxyalkyl, or halogenated lower alkyl radical; the ureido nitrogen atom joined to the phenyl nucleus is unmethylated or methylated; and the ureido nitrogen atom in the 3 position of the ureido moiety is substituted with at least one lower alkyl, lower hydroxyalkyl, or lower alkoxy radical.

2. The carbamate of claim 1 wherein said phenylalkyl moiety is a benzyl, a phenylethyl, a phenylpropyl, or a phenylbutyl radical including isomeric phenylpropyl and phenylbutyl radicals; the ureido nitrogen atom joined to the phenyl nucleus is unmethylated; and the ureido nitrogen atom in the 3 position of the ureido moiety is dimethylated.

3. m-(3,3-dimethylureido)benzyl N-methylcarbamate.

4. m-(3,3-dimethylureido)benzyl N-ethylcarbamate.

5. m-(3,3-dimethylureiod)benzyl N-(2-chloroethyl)carbamate.

6. m-(3,3-dimethylureido)benzyl N-(tert-butyl)carbamate.

References Cited
UNITED STATES PATENTS

| | | | |
|---|---|---|---|
| 3,399,048 | 8/1968 | Herrett | 210—482 C |
| 3,434,822 | 5/1969 | Wilson | 260—479 C |

LORRAINE A. WEINBERGER, Primary Examiner

P. J. KILLOS, Assistant Examiner

U.S. Cl. X.R.

71—76, 88, 94, 106; 260—247.2 B, 293.74, 468 E, 971 C, 553 A

UNITED STATES PATENT OFFICE
CERTIFICATE OF CORRECTION

Patent No. 3,766,250         Dated   Oct. 16, 1973

Inventor(s)   Kenneth P. Dorschner and James A. Albright

It is certified that error appears in the above-identified patent and that said Letters Patent are hereby corrected as shown below:

Column 2, line 34, correct "meta 1 ureidophenylalkyl carbamates" to read: "meta-ureidophenyl-alkyl carbamates".

Column 6, Table I, under column headed "Barnyard grass", second line, correct "(a)" to read: "0(a)".

Column 5, Table I, under column headed "Compound", last line, correct "N-(α chloro-acetyl)-N-isopropyl aniline (Standard)". to read: "N-(α-chloro-acetyl)-N-isopropyl aniline (Standard)".

Column 7, Claim 5, line 1, correct "m-(3,3 - dimethylureiod benzyl N-(2-chloroethyl) carbamate" to read: "m-(3,3-dimethylureido)benzyl N-(2-chloroethyl) carbamate".

Signed and sealed this 23rd day of July 1974.

(SEAL)
Attest:

McCOY M. GIBSON, JR.
Attesting Officer

C. MARSHALL DANN
Commissioner of Patents